UNITED STATES PATENT OFFICE.

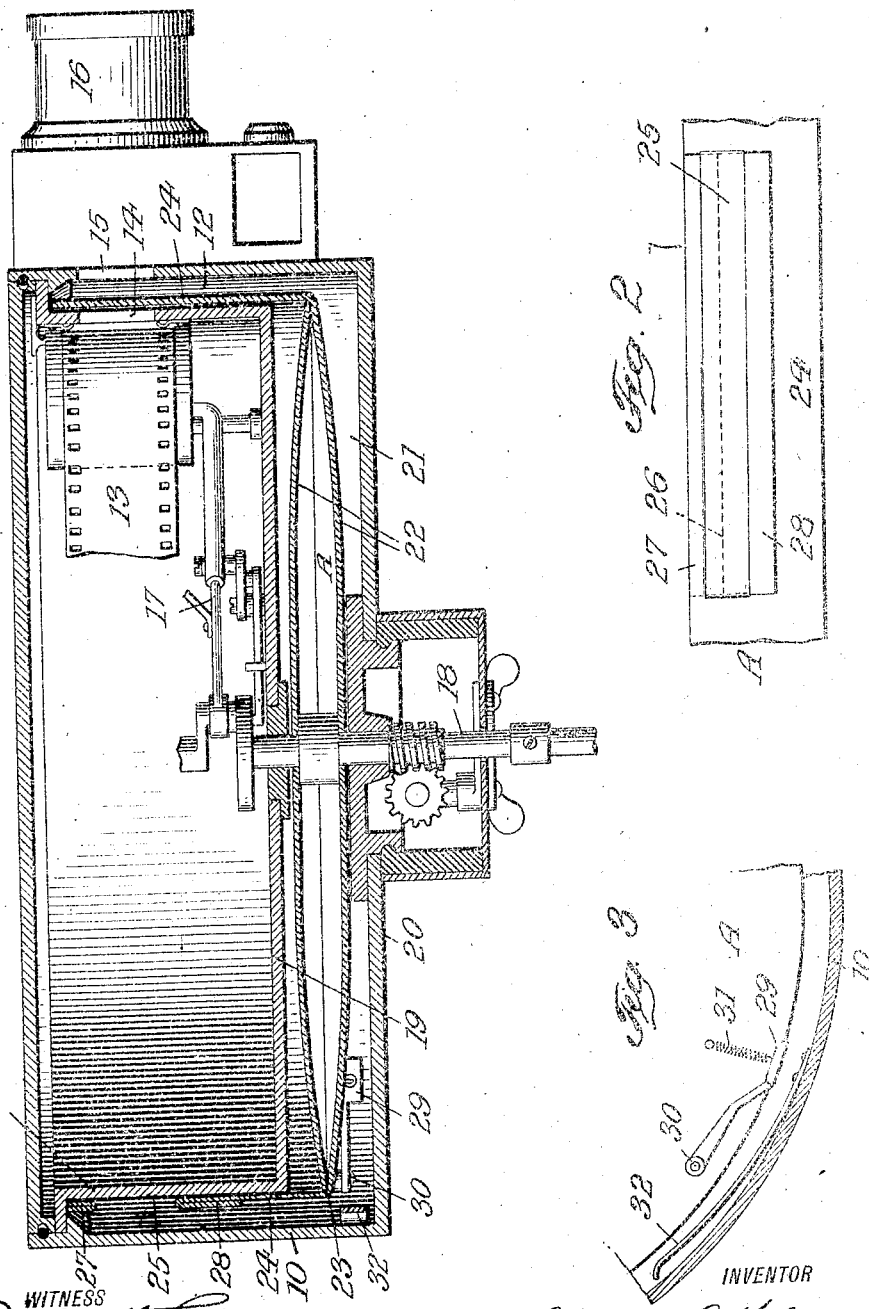

CARL E. AKELEY, OF NEW YORK, N. Y., ASSIGNOR TO AKELEY CAMERA, INC., OF NEW YORK, N. Y., A CORPORATION OF NEW YORK.

ROTARY SHUTTER FOR MOVING-PICTURE CAMERAS.

1,177,164.

Specification of Letters Patent. Patented Mar. 28, 1916.

Original application filed August 3, 1914, Serial No. 854,777. Divided and this application filed April 10, 1915. Serial No. 20,412.

*To all whom it may concern:*

Be it known that I, CARL E. AKELEY, a citizen of the United States, and a resident of New York city, county and State of New York, have invented certain new and useful Improvements in Rotary Shutters for Moving-Picture Cameras, of which the following is a specification.

This invention relates to a novel rotary shutter more particularly designed to be used in conjunction with moving picture cameras, such for instance as shown in a copending patent application filed by me August 3rd, 1914, under Serial Number 854,777, of which this application is a division.

In the accompanying drawing: Figure 1 is a cross section through part of a moving picture camera provided with my improved rotary shutter; Fig. 2 an outer view of part of the shutter laid out in a plane, and Fig. 3 a detail of the speed regulator for the shutter.

Within a casing 10 of preferably cylindrical shape is located a likewise cylindrical box 11, spaced from casing 10 to form an intervening annular chamber 12. Box 11 is adapted to contain the reel of film 13 which film is adapted to be intermittently fed across an opening 14 of said box, said opening being alined with a similar opening 15 provided within casing 10 opposite the lens tube 16. The intermittent advance movement of film 13 is effected through a suitable feeding device 17 actuated by a power shaft 18 which device does not form part of the present invention.

As clearly illustrated in Fig. 1, the inner end wall 19 of the film box 11 is spaced from the corresponding wall 20 of casing 10 thereby providing a circular chamber 21 that communicates with the annular chamber 12. Within chamber 21 is arranged a pair of oppositely bulged disks 22 of a shutter A that are rigidly mounted at their spaced centers upon shaft 18 in any suitable manner. The disks 22 are firmly united along their contacting peripheries as at 23 and carry here a cylindrical shell 24. The latter is provided with an opening 25 adapted to expose that film-portion which happens to be located opposite opening 14, the opening 25 being of a peripheral length as to permit an exposure of sufficient time. In order to maintain a true balance of the shutter and to prevent a swerving motion thereof, opening 25 is not simply cut out from shell 24, but a substantially H-shaped incision 26 is first provided in said shell and then the flaps 27, 28 thus formed are folded against the unmutilated portions of the shell as clearly illustrated in Figs. 1 and 2.

For preventing the shaft 18 and the shutter A carried thereby from being operated at an excessive rate of speed an automatic brake is provided which is shown to comprise a brake shoe 29 pivoted to the shutter at 30 and influenced by a spring 31. Opposite the path of shoe 29 is arranged a resilient blade or buffer 32 which is secured to casing 10 in suitable manner. The weight of shoe 29 and the strength of spring 31 should be so calculated that during the normal speed of the shutter, the centrifugal force acting on the brake shoe will be insufficient to cause an engagement between said shoe and blade. As soon as the speed increases however, the shoe 29 will come into contact with the blade 32 thereby correspondingly retarding the rotary speed of the shutter.

It will be seen that my novel rotary shutter is of simple construction, may be easily operated and is not apt to swerve during operation.

I claim:

1. In a moving picture camera, a casing, a lens tube secured thereto, a cylindrical shutter within the casing and having an opening that is adapted to become alined with the lens tube, a spring-influenced brake shoe pivoted to the shutter, a resilient blade secured to the casing and adapted to be engaged by the brake shoe, and means for rotating the shutter.

2. In a moving picture camera, a casing, a shaft journaled therein and a shutter carried thereby, said shutter consisting of a pair of oppositely bulged disks united along their periphery and secured to said shaft, and of an apertured cylinder carried by said disks.

3. In a moving picture camera, a casing, a shaft journaled therein, and a shutter carried thereby, said shutter consisting of a pair of oppositely bulged disks united along their periphery and secured to said shaft, and of an apertured balanced cylinder carried by said disks.

4. A rotary shutter comprising a cylindrical shell having a pair of oppositely upturned flaps to form an intervening opening, a rotary shaft, and means for securing said shell to said shaft.

CARL E. AKELEY.